(12) United States Patent
Comerford et al.

(10) Patent No.: US 8,123,429 B2
(45) Date of Patent: Feb. 28, 2012

(54) REINFORCING BAR (75) Inventors: Ernest Comerford, Glen Aplin (AU); Mark Rankin, Toowong (AU)

(73) Assignee: Monkey Bar Couplers Pty Ltd, Victoria (AU)

( * ) Notice: Subject to any disclaimer, the term of this patent is extended or adjusted under 35 U.S.C. 154(b) by 954 days.

(21) Appl. No.: 11/883,785

(22) PCT Filed: Feb. 8, 2006

(86) PCT No.: PCT/AU2006/000163
§ 371 (c)(1),
(2), (4) Date: Apr. 16, 2008

(87) PCT Pub. No.: WO2006/084320
PCT Pub. Date: Aug. 17, 2006

(65) Prior Publication Data
US 2008/0307741 A1    Dec. 18, 2008

(30) Foreign Application Priority Data

Feb. 8, 2005  (AU) ................................ 2005900557

(51) Int. Cl.
F16B 2/02 (2006.01)

(52) U.S. Cl. .................. 403/311; 403/339; 403/364

(58) Field of Classification Search .................. 403/311, 403/339, 364, 393
See application file for complete search history.

(56) References Cited

U.S. PATENT DOCUMENTS

| | | | | |
|---|---|---|---|---|
| 53,219 A * | 3/1866 | Fawcett | .......... | 403/340 |
| 295,559 A * | 3/1884 | Kitson | .......... | 403/266 |
| 709,400 A * | 9/1902 | Fitzpatrick | .......... | 403/341 |
| 867,312 A * | 10/1907 | Shutz | .......... | 403/341 |
| 1,003,973 A * | 9/1911 | Barrickman | .......... | 403/340 |
| 1,331,776 A * | 2/1920 | Lewis | .......... | 403/339 |
| 1,368,191 A | 2/1921 | Nelson | | |
| 5,098,216 A | 3/1992 | Caperton | | |
| 5,407,292 A * | 4/1995 | Collins | .......... | 403/339 |
| 5,439,309 A | 8/1995 | Raz | | |
| 5,919,205 A * | 7/1999 | Heimberger et al. | .......... | 606/205 |
| 2003/0231925 A1 | 12/2003 | Chen | | |

FOREIGN PATENT DOCUMENTS

| | | |
|---|---|---|
| DE | 82 06 277 U1 | 8/1982 |
| DE | 35 04 004 A1 | 8/1986 |
| FR | 2 580 344 A1 | 10/1986 |
| WO | 94/24447 A1 | 10/1994 |

OTHER PUBLICATIONS

Derwent Abstract Accession No. 97-513541/48, CN 1124812 A (Yang), Jun. 19, 1996, Abstract.
Derwent Abstract Accession No. 98-096117/09, JP 09324495 A, (Mitsutomo), Dec. 16, 1997.

* cited by examiner

Primary Examiner — Victor MacArthur
(74) Attorney, Agent, or Firm — The Webb Law Firm

(57) ABSTRACT

A reinforcing bar comprises a shaft extending along a portion of the length of the bar and a termination extending along an end portion of the bar. The termination incorporating an engagement face incorporating locking formations thereon arranged to interfit with a complementary shaped termination to form an interlock operative to accommodate axial loading.

22 Claims, 4 Drawing Sheets

REINFORCING BAR

TECHNICAL FIELD

The present invention relates generally to reinforcement for concrete or other cementitious construction. In particular, the invention is directed to the coupling of reinforcing bars and is herein described in that context. However, it is to be appreciated that the invention has broader application and may be utilised in the coupling of a reinforcing bar to other rigid objects such as metal plates or the like.

BACKGROUND OF THE INVENTION

In the construction industry, structures (such as walls, floors, slabs and columns) of concrete are produced by positioning reinforcing such as steel reinforcing bars in a region where concrete is then poured to produce the structure. The bars are supported in desired positions and often there is a need to join length of bars to each other to ensure that the reinforcing not only is correctly positioned, but is able to transmit load across the coupling so that the bars can accommodate a large part or even their full axial capacity in either tension or compression.

In the past, wire ties or wraps have been secured around overlapping ends of adjacent bars to hold them relative to one another prior to the concrete pour. Axial loads are transferred from one bar to the other overlapped bar through the concrete encasing the two joined bars. This method uses more bar than necessary as the overlapped length of bar is only useful to effect the transfer of axial loads and these overlapping lengths can form a significant mass of reinforcing bar in a structure.

In another arrangement, bars are formed with short externally threaded end portions and a sleeve with left handed and right handed internal thread portions is used to allow adjacent end of the bars to be connected to one another.

The formation of the external threaded portions on ends of the bars results in those ends being of less diameter than the remainder of the bar and thus is undesirable since engineering requirements may dictate that a bar having a predetermined diameter is used. One way to overcome this difficulty is to employ oversized bars. This ensures that the threaded end of the bar is still of a diameter equal to or greater than the diameter dictated by the engineering requirements. However, with this arrangement, most of the bars are of a gauge greater than is necessary.

Ideally the properties of the coupling, such as its axial capacity and its ductility, are at least the same as the major portion of the bars and that only limited longitudinal slip will occur when the coupling is loaded. If these properties are not within certain tolerances, then the coupling can significantly compromise the resulting structure. For example, if there is excessive longitudinal slip then this can cause excessive localised cracking thereby heightening the risk of corrosion, and may also cause excessive deflection. If the coupling is not as ductile as the main part of the bar, then this can cause localised stress concentration which potentially could result in catastrophic failure of the coupling.

The use of separate coupling elements, such as the threaded sleeve mentioned above, may be problematic where a construction site has reinforcing bars of different strength as there is a danger of a potential mismatch of the sleeve to the bars. Furthermore, the use of a threaded arrangement requires for there to be some play between the components to enable easy installation, which in turn may result in unacceptable longitudinal slip under load. Also there is an ongoing risk that the couplings are not adequately tightened on site which will compromise the coupling.

SUMMARY OF THE INVENTION

According to a first aspect, there is provided a reinforcing bar comprising a shaft extending along a portion of the length of the bar and a termination extending along an end portion of the bar, the termination incorporating an engagement face incorporating locking formations thereon arranged to interfit with a complementary shaped termination to form an interlock that is operative to accommodate loading.

In the context of the specification, "axial loading" means loading that is applied in the direction that the termination extends so that the interlock is in tension or compression. Further, the term "interlock" means an arrangement where components are connected together in a manner that prevents separation under load in at least one direction, even if the components are free to separate under load in another direction.

In accordance with the invention, a reinforcing bar is provided which, by virtue of the termination, allows direct connection of the bar with another object, such as another reinforcing bar, having a complementary shaped termination. The advantage of this arrangement is that the integrity of the coupling is enhanced as it does not require the use of other components to transmit axial load across the interlock. Further, by making the terminations of appropriate size and shape, the inventor has found that it is possible for the coupling to meet desired requirements for ductility and axial capacity. Also longitudinal slip under load can be maintained to acceptable levels.

In one form, the termination is formed integral with the bar shaft. In this arrangement, in one form, the termination is enlarged as compared to the bar shaft so that the interlock exhibits adequate performance characteristics (e.g. strength under axial load and ductility).

In another form, to ensure adequate performance characteristics of the interlock, the termination is made from a different material to the reinforcing bar shaft or from the same material as the shaft but with its material properties altered. In these latter arrangements, the termination may be the same size as the bar shaft, or smaller, or may be enlarged as in the earlier arrangement.

In one form, the locking formations are profiled so that the interlock is arranged to accommodate substantially all of the axial load. In one embodiment, a retaining device may be utilised to retain the terminations in engagement, but this device is not necessarily designed to be placed under load on axial loading of the reinforcing.

According to a second aspect, there is provided a coupling for interconnecting first and second reinforcing bars, the coupling comprising:

first and second terminations extending along an end portion of the first and second reinforcing bars respectively, the terminations each including an engagement face incorporating locking formations thereon, the engagement faces of the terminations being in opposing abutting relation with the locking formations interfitting to form an interlock operative to accommodate axial loading across the interlock; and a retaining device disposed around the interlock to retain the engagement faces in the opposing abutting relation to one another.

In a particular embodiment, the termination is shaped to form an interlock with a complementary termination of identical shape. As such, the first and second terminations are the same. Such an arrangement is beneficial in that it does not require the terminations to be handed thereby making it easier to install onsite.

In a particular form, the locking formations comprise a plurality of spaced apart upstands extending transversely across the engagement face and one or more recesses disposed between adjacent ones of the upstands. In use, the upstands and recesses interfit with upstands and recesses disposed on the complementary shaped termination to form the interlock.

In a particular embodiment, the upstands include opposite side walls that are interconnected by a bridging portion. Furthermore, the opposing side walls of adjacent ones of the upstands may define respective ones of the recesses.

In a particular form, the side walls incorporate bearing surfaces which are arranged to interengage in formation of the interlock.

In a particular form, the upstands are stepped downwardly along the engagement face towards the terminal end of the bar. This arrangement enables the loading to be distributed more evenly across the termination. In one embodiment, the upstands are of different size so as to facilitate correct location of the upstands into corresponding recesses of the other termination.

In one embodiment, in use, the coupling is able to accommodate axial loading which is at least equal to the axial capacity of the shafts of the reinforcing bars and exhibits increased ductility as compared to the bar shafts. In some situations, the coupling may be advantageously used to connect reinforcing that have different shaft diameters. This is commonly desirable in construction where the loading conditions change across the structure. Using the coupling of at least one embodiment of the present invention, this can be achieved by providing reinforcing having a termination which is typically oversized for that bar shaft but which is in complementary shape to reinforcing of the larger shaft diameter.

In one form, the bearing surfaces extend generally normal to the direction of axial loading. With this arrangement the reaction forces applied in the coupling are contained within the terminations and there is no significant vector force that will load a surrounding retaining device under normal elastic loading conditions. Furthermore, by having the bearing surfaces generally normal to the direction of axial loading, the longitudinal slip within the coupling may be contained to acceptable limits without requiring the fit between the retaining device and the terminations being of a very tight tolerance to inhibit lateral movement of the interlocks. In this arrangement any lateral movement between the terminations (say for example that which may be possible due to the gap between the retaining device and the interlocked terminations) will not translate to a longitudinal displacement. Alternatively, the tight tolerance between the retaining device and the terminations may be provided through post forming of the retaining devices (e.g. when a sleeve is used, by forcing that sleeve over a mandrel) or by the use of packing, such as shims or the like in between the interlocking terminations and the retaining device. In this latter form, the slope of the bearing surfaces is not as critical.

In a particular form, the bearing surfaces extend at an angle of within 10° to the perpendicular of the direction of axial loading and more preferably within an angle of 5° to the perpendicular.

In a particular embodiment the surrounding sleeve has a section modulus which is able to provide resistance to shear loading greater than the loading capacity of the reinforcing bar shaft. In this way, the couplings may be used when loaded as a shear connector.

In yet a further aspect, the present invention provides a method of connecting first and second reinforcing bars, the method comprising the steps: interconnecting first and second reinforcing bars by forming an interlock between terminations formed on the end of the reinforcing bars, the interlock extending along an axis and being formed by interfitting locking formations formed on the respective terminations; and providing a retaining device about the interlock to retain the locking formations in interfitting relation.

In yet a further aspect, the present invention provides a method of transferring load between first and second reinforcing bars, the method comprising the steps: interconnecting first and second reinforcing bars by forming an interlock between terminations formed on the end of the reinforcing bars, the interlock extending along an axis and being formed by interfitting locking formations formed on the respective terminations; providing a retaining device about the interlock to retain the locking formations in interfitting relation; and transferring loading through the interlock in the direction of the interlock axis without inducing any substantial load on the retaining device.

DESCRIPTION OF THE DRAWINGS

It is convenient to hereinafter describe an embodiment of the present invention with reference to the accompanying drawings. It is to be appreciated however that the particularity of the drawings and the related description is to be understood as not limiting the preceding broad description of the invention.

In the drawings.

DETAILED DESCRIPTION OF THE DRAWINGS

Figures 1, 4:
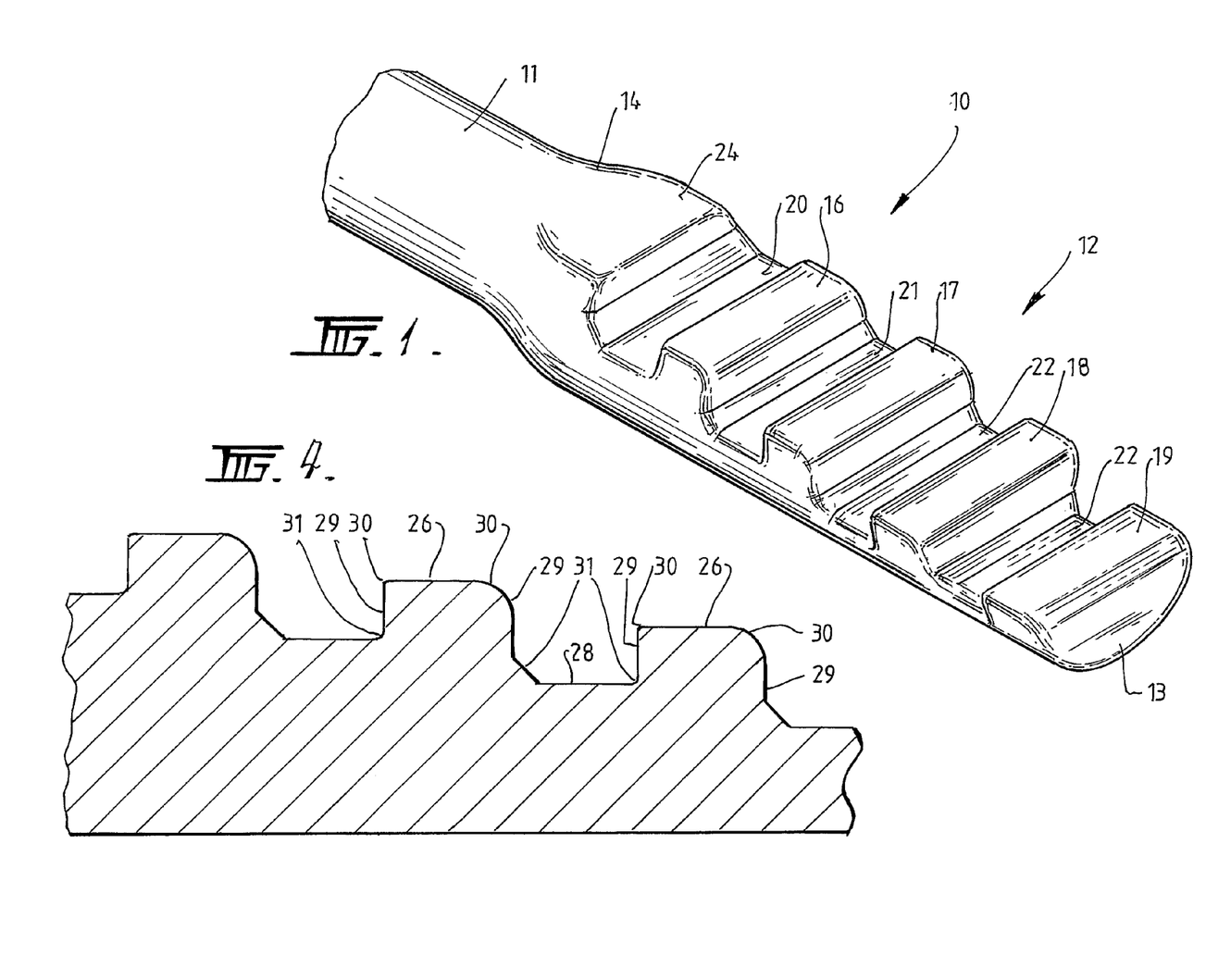
FIG. 1 is a perspective view of a termination of a reinforcing bar.
FIG. 4 is a detailed view to an enlarged scale of the locking formations on the termination of the bar of FIG. 1.
Figure 2:
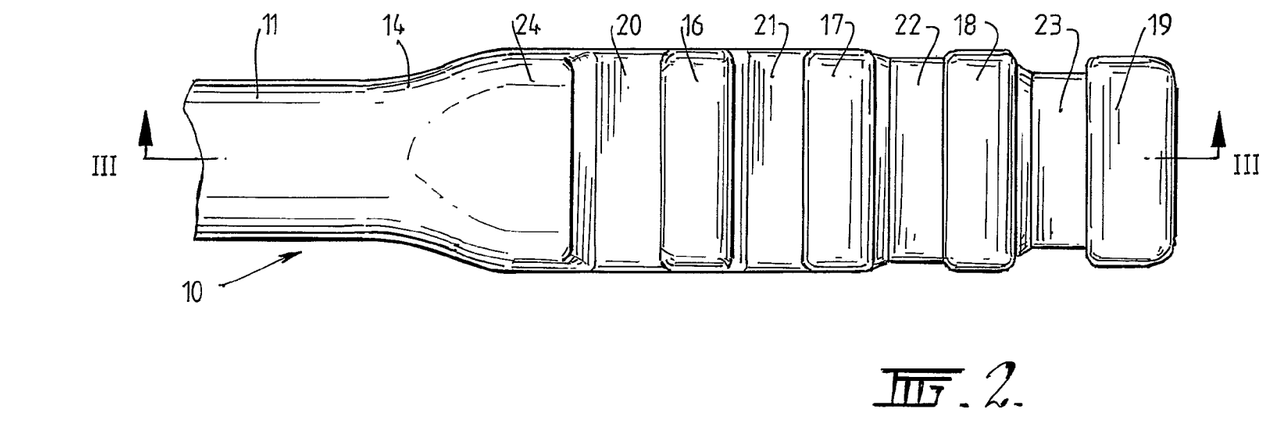
FIG. 2 is a plan view of the termination of FIG. 1.
Figure 3:
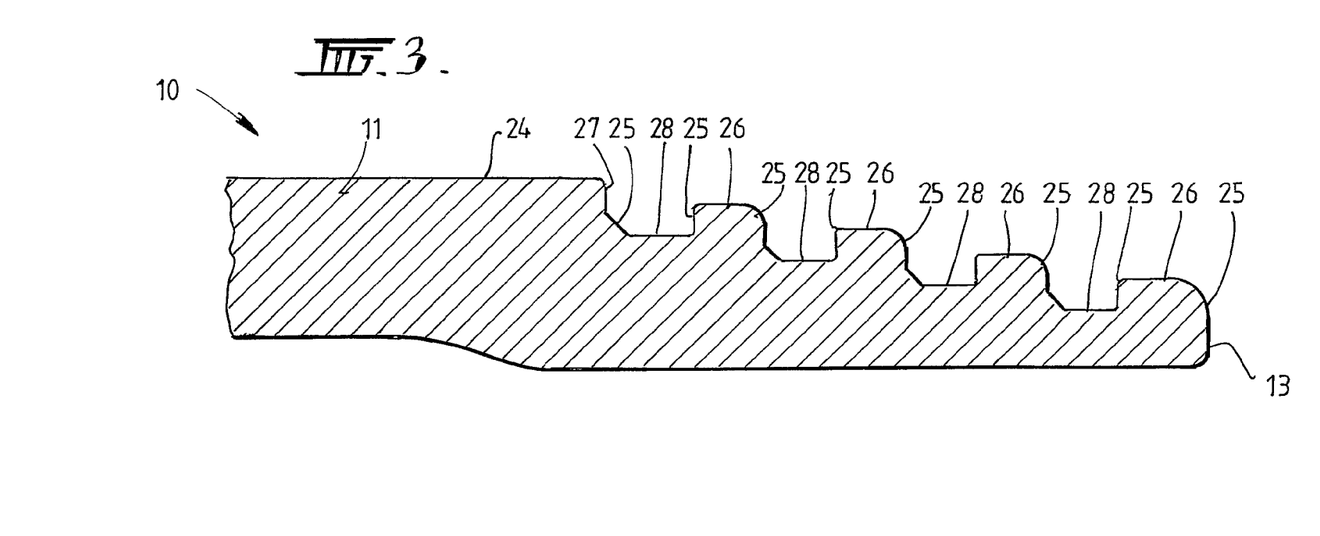
FIG. 3 is a sectional elevation of the termination along section lines III-III of FIG. 2.

Turning firstly to FIGS. 1 to 3, a partial view of a reinforcing bar 10 is shown. The bar 10, which is typically made from steel, incorporates a shaft 11 which extends along the majority of the length of the bar 10. Whilst only a small portion of the shaft 11 is shown, it is to be appreciated that this shaft may extend for many meters. These bars are made in continuous lengths and are cut to size depending on the requirements of a particular job. Furthermore, for convenience, the shaft 11 as shown is plain. Again, it is to be appreciated that the shaft may include ribbing, and such bar is commonly referred to as deformed bar.

The reinforcing bar 10 further includes a termination 12 which extends along an end portion of the bar to the terminal end 13 of the reinforcing bar 10. In the illustrated form, the termination 12 is integrally formed with the shaft 11 and is enlarged as compared to that shaft (i.e. it extends radially outwardly from a central axis CL of the reinforcing bar a greater distance than the shaft). A transition zone 14 is present between the shaft 11 and the enlarged termination 12.

The enlarged termination 12 is typically formed by deforming an end of the bar. In this arrangement, prior to formation, the whole of the bar 10 has a diameter corresponding to the diameter of the shaft 11.

The termination 12 includes an engagement face 15 which extends along a length of the bar 10 and projects outwardly therefrom. This engagement face 15 is profiled to include locking formations which enables the bar 10 to be coupled to another bar or other object to form an interlock as will be discussed in more detail below. The locking formations in the illustrated form comprise a plurality of spaced apart upstands 16, 17, 18 and 19 and a plurality of recesses 20, 21, 22 and 23. The majority of these recesses 21, 22 and 23 extend between adjacent ones of the upstands (16, 17, 18 and 19). A proximal one of the recesses 20 extends between a hub portion 24 of the termination and the most proximal upstand 16.

As best illustrated in FIGS. 2 and 3, the termination is configured as a part cylinder having a diameter which is greater than the axis of the shaft 11. Furthermore, the engagement face 15 is formed effectively as a "cut out" from that cylindrical termination. However, it is to be appreciated that whist the engagement face 15 may be considered as a cut out portion, it is not limited to such a method of manufacturing as the termination may be formed by a forging operation of the like into its final shape without the need for any substantial removal of material. Co-pending International application filed by the Applicant and entitled "A Method and Apparatus for Forming Metal Reinforcing" discloses processes for the manufacture of the reinforcing bar 10 using a forging operation, and the contents of this application are herein incorporated by cross reference.

As best illustrated in FIG. 3, each of the upstands (16, 17, 18 and 19) include opposite side walls 25 and which are interconnected by bridging portions 26. Furthermore the hub portion 24 of the termination 12 includes a side wall 27. With this arrangement, the walls 25, 27 also act as the side walls for the recesses. Base portions 28 interconnect these adjacent side walls to form the base of the respective recesses (20, 21, 22, 23).

The side walls 25 in the illustrated form are linear and extend across the entire engaging face 15. Further, the bridging portions 26 and the bases 28 are also formed as flat surfaces. As best illustrated in the enlarged view of FIG. 4, each of the side walls 25 is formed from three components. The first component is a bearing surface 29 which is disposed in a mid region of the side wall and which is normal to the centreline (CL) of the bar 10. A first transition region 30 is formed above the bearing surface 29 and forms the intersection between that bearing surface 29 and the bridging surface 26. A lower transition region 31 extends from the bearing surface 29 to the base portion 28. Both the upper and the lower transition regions (30 and 31) incorporate a radius with the radius of the top transition region 30 being smaller than the radius of the lower transition region 31.

The upstands and recesses of the engagement face 15 are shaped so that the termination 12 will form an interlock with a termination of the same shape.

The end upstand 19 adjacent the terminal end 13 of the bar 10 is wider than the other upstands. Further, the innermost recess 20 is also wider so as to be able to receive an upstand of the shape of the end upstand 19. This arrangement is provided so as to facilitate proper mating of the terminations in forming the interlock.

Finally, as best illustrated in FIG. 3, the upstands are arranged to step downwardly towards the terminal end 13. With this arrangement, the bearing faces 29 of the various upstands are not axially aligned but rather are at different radial spacings from the centreline CL. This is advantageous as it enables a more even distribution of stress through the termination when it is coupled to another termination.

Figures 5, 6:
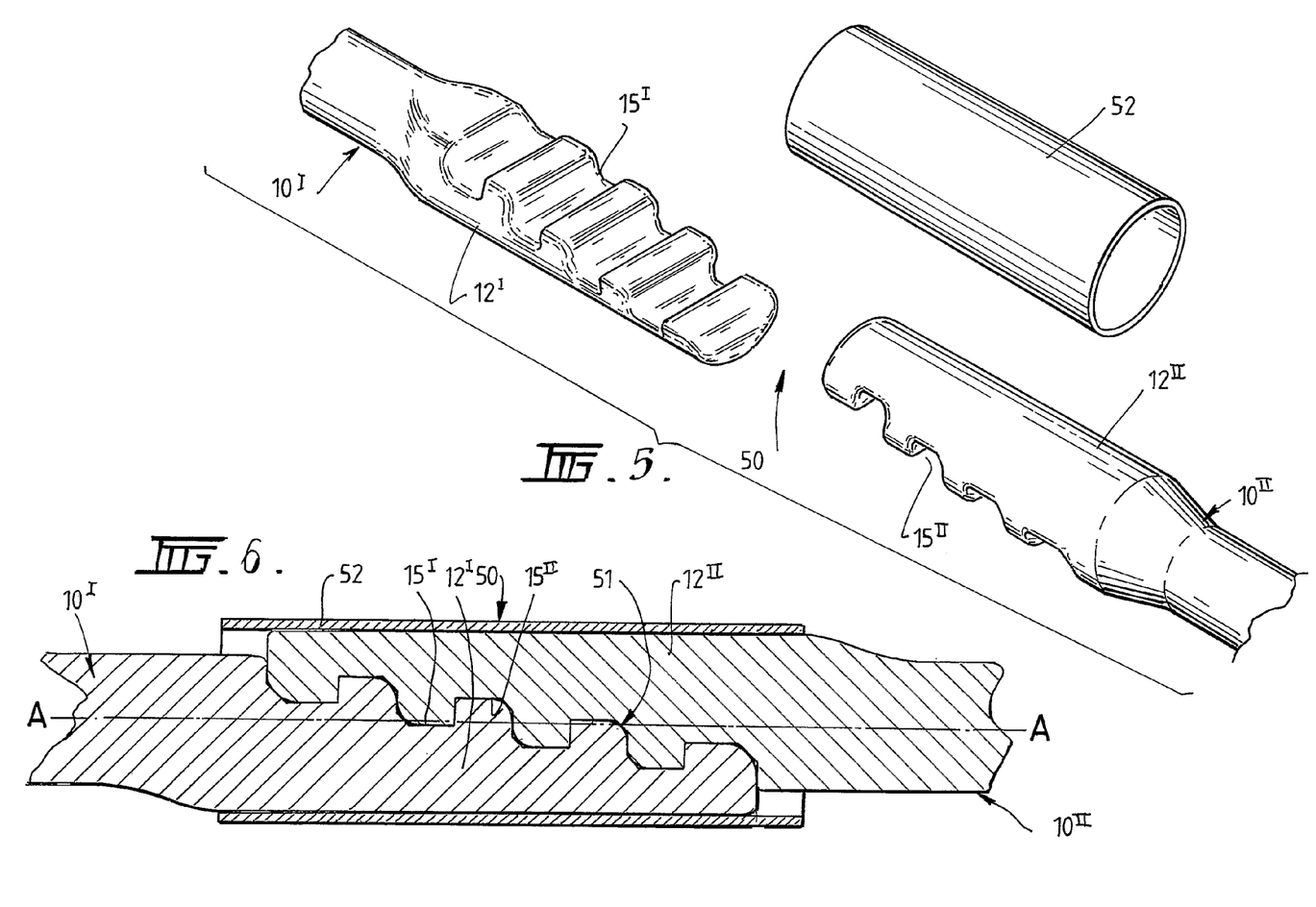
FIG. 5 is an exploded view showing the components of a coupling of two reinforcement bars of FIG. 1.
FIG. 6 is a sectional view of the coupling of FIG. 5.

Turning now to FIGS. 5 and 6, a coupling 50 is disclosed which is formed from interconnection of the termination 12 of one reinforcing bar with an identical termination of another like bar. For convenience in the following description of the coupling 50 one reinforcing bar is designated using superscript I whereas the other reinforcing bar includes superscript II with associated features given like designations.

The coupling 50 is formed by interconnecting the terminations $12^I$ and $12^{II}$ to form an interlock 51. With the upstands of one termination interfitting within a corresponding recesses of the other termination. The interlock extends along an axis (designated A-A) which, in the illustrated form, is coaxial with the central axis of the respective reinforcing bars $10^I$ and $10^{II}$. Furthermore, once the terminations $12^I$ and $12^{II}$ are interconnected along their engagement faces $15^I$ and $15^{II}$ the exterior surface of the termination forms a complete cylinder (which in the illustrated form is a circular cylinder) having a diameter which is greater than the diameter of the respective shafts $11^I$ and $11^{II}$.

The coupling 50 also includes a retaining device 52 which is arranged to prevent separation of the terminations. In the illustrated form, the retaining device 51 is in the form of a sleeve, typically a metal sleeve having an internal bore which is just slightly larger than the exterior diameter of the cylinder formed by the interconnected terminations. In this way the sleeve can slide over the lapping terminations and is typically retained in place by a wire tie or the like.

In use, the reinforcing bars $10^I$ and $10^{II}$ are arranged to be embedded in concrete so as to accommodate load induced in the resulting structure. Typically there are two types of loading conditions. The first is axial loading which extends primarily in the direction of the bars axis CL. This axial loading may be in tension or in compression. The other loading condition is shear where the loading is in a direction normal to the centreline CL. The coupling 50 is arranged to accommodate loading in both these conditions as will be discussed in more detail below.

Under axial load, the reinforcing bars $10^I$ and $10^{II}$ may be biased apart (under tension) or biased together, with tensile loading being the predominant condition. This axial loading is accommodated by the coupling 50 through interengagement of the upstands in the two terminations $12^I$ and $12^{II}$. In particular, the upstands are arranged to engage along their bearing surfaces $29^I$, $29^{II}$ formed in the side walls. These form the regions of contact of the upstands under axial loading and in particular there are no points of contact between the transition regions 30, 31 because of the smaller radius of the top transition region 30 as compared to the lower transition region 31. Because the bearing surfaces $29^I$, $29^{II}$ are disposed normal to the direction of loading there is no vector force developed to load the surrounding sleeve 51. As such, this axial loading is fully contained within the terminations.

To accommodate the shear load, the retaining device 51 has a section modulus which is sufficient to accommodate the design shear loading. With this arrangement, it is not necessary to orientate the reinforcing bars so that shear is accommodated by the interlock.

Figure 7:
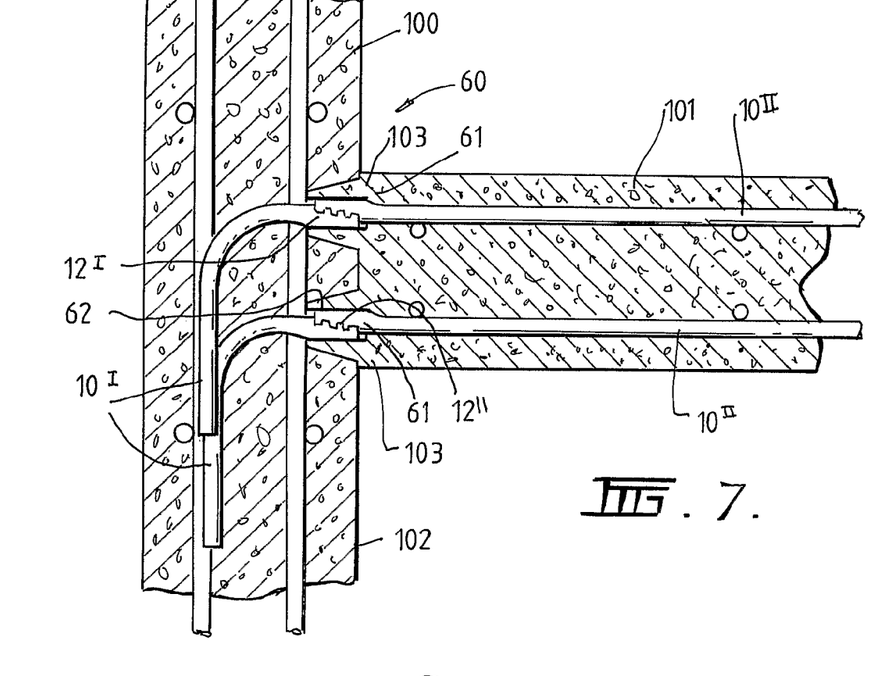
FIG. 7 is a sectional view of a variation of the coupling of FIG. 5 when installed as a shear connector.

FIG. 7 illustrates a shear coupling 60 which is a variation of the coupling 50. As the shear coupling includes the components of the coupling 50 described above for convenience like features have been given like reference numerals. Furthermore for ease of description, superscript is used to distinguish between the two reinforcing bars provided in the coupling 60.

The shear connector 60 is utilised to interconnect reinforcement from a wall 100 through to a slab 101. To form this connection, the wall 100 is constructed first and incorporates reinforcing bars $10^I$. Instead of extending solely in the plane of the wall 100, the reinforcing bars $10^I$ are turned so as to extend to a face 102 of the wall 100. The wall 100 is cast with recesses 103 that project in from the face 102 so as to expose the terminations $12^I$ and make those terminations accessible from the face 102 of the wall 100. In this way these terminations $12^I$ are ready to receive the reinforcing bars $10^{II}$ in the set up of the reinforcing for the slab 101.

In the illustrated form, the terminations $12^I$ $12^{II}$ are of a shorter length having only three upstands rather than the four upstands in the earlier embodiment. With this arrangement, the terminations $12^I$ do not protrude form the face 102 of the wall 100.

In setting up the reinforcing for the slab 101, the reinforcing bars $10^{II}$ can simply be connected to the reinforcing bars $10^I$ by forming an interlock 61 through interconnection of the termination $12^{II}$ with the terminations $12^I$. The sleeves 62 are then disposed over the interlocks to retain the terminations in engagement. Moreover the sleeves 62 have a section modulus which is sufficient to accommodate the design shear loading at the couplings 60.

Once the reinforcing has been connected, the concrete can then be poured to form the sleeve. In casting the concrete the recesses 103 are fully filled so as to ensure there is adequate cover over the reinforcing.

Figure 8:
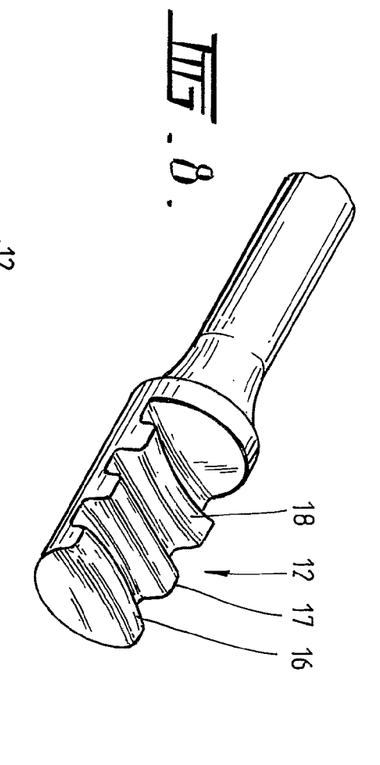
FIG. 8 is a perspective view of a variation of the termination of FIG. 1 with a different engagement face profile.
Figure 9:
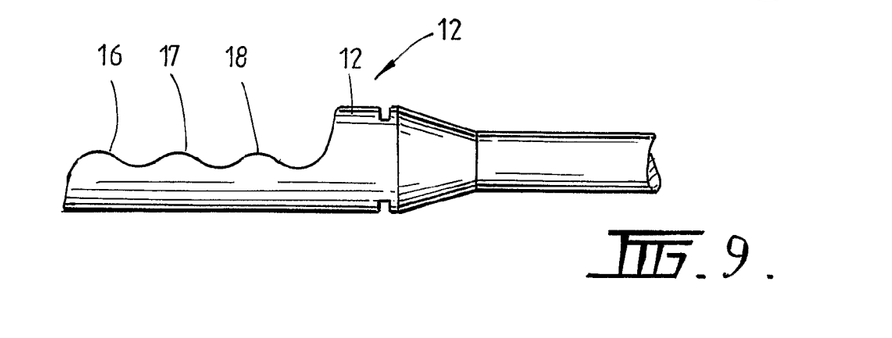
FIG. 9 is a side view of yet a further variation of the termination of FIG. 1.

FIGS. 8 and 9 show further variations on the profile of the terminations 12 disclosed above. Again as these terminations include many of the features described above like features have been given like reference numerals.

In the embodiment of FIG. 8, the upstands 16, 17 and 18 of the terminations 12 are of more complex design being arcuate rather than linear as in the earlier embodiments.

FIG. 9 illustrates yet a further variation on the profile of the termination 12. In this embodiment, the upstands are more undulating than in the earlier embodiments. In the embodiments of both FIGS. 8 and 9, the bearing surfaces formed in the side wall inclined from perpendicular to the direction of axial loading. This is particularly the case for the embodiment of FIG. 9. As such, in these embodiments, loading under axial loading there will be a transfer of force to the retaining device, although a majority of the load can be taken through the bar. Further, because of the shape of these upstands, it may be necessary to have a very tight tolerance between the terminations and the retaining device to minimise lateral slip. This tolerance can be formed by post forming of the retaining device or by the use of packing as described above.

A coupling arrangement as described above has substantial practical benefit. As each termination extends from the bar shaft, the strength of the termination can be properly matched to the strength of the bar, particularly where the termination is formed from the same material as the bar shaft. A major problem with prior art couplers that use separate components is the fact that the reinforcing bar may vary in strength (e.g. nominally 500 MPa/bar may have an allowed top strength of 650 Mpa). This means that couplers may be mismatched with extremely strong bars so the couplers need to be made to accommodate this possible mismatch. This can have attendant problems as it may reduce the ductility properties of the coupler itself by providing a coupler of higher strength than required. The integral nature of the termination to the shaft obviates this mismatch and allows for ductility and strength to the joint to be correctly matched to the bar shaft.

Typically by incorporating an enlarged end with the profiled engagement face and having the material of the termination the same as the shaft, the strength at the coupling is greater than the bar being joined. In one form, the coupling has a strength of approximately 110% of the strength of the bar although as will be appreciated this could be varied by varying the dimensions of the various components in the termination.

Even with this increased strength, the coupling exhibits greater ductility than the bar shaft and tests conducted by the inventor has shown this to be the case. Without being bound by theory, this ductility increase has shown to be found as under plastic deformation the upstands tend to collapse which allows elongation along the coupling.

Also, the normal bearing faces limit the longitudinal slip of the coupling under load. Again tests conducted by the inventor have indicated that there is slip of less than 0.1 mm under prescribed loading test conditions (typically under 300 Mpa of axial loading). A feature of having the bearing faces normal to the direction of axial loading is that the slip is not dependent on the fit between the sleeve 51 and the coupled terminations. With this arrangement, the sleeve does not need to be manufactured to a precise tolerance.

Further, the coupling has a relatively thin profile which is advantageous as it may allow thinner concrete sections to be used in some circumstances whilst still allowing adequate concrete cover to provide over the reinforcing.

Finally, an advantage of the coupling is that it is easy to assemble onsite and easy to ascertain onsite whether the coupling has been properly installed. If the terminations have not been properly connected together, then it may not be possible to locate the sleeve over the coupled terminations and/or it is clearly visible as part of a termination projects beyond the sleeve length.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Variations and modifications may be made to the parts previously described without departing from the spirit or ambit of the invention.

The invention claimed is:

1. A reinforcing bar for concrete reinforcing comprising:
a shaft extending along a portion of the length of the bar and a termination extending along an end portion of the bar, the termination being enlarged as compared to the shaft, wherein the termination incorporates an engagement face incorporating locking formations thereon arranged to interfit with a complementary shaped termination to form an interlock arranged to accommodate axial loading,
wherein the locking formations comprise a plurality of spaced apart upstands extending transversely across the engagement face and a plurality of recesses disposed between adjacent ones of the upstands, each upstand includes opposite side walls interconnected by a bridging portion, and the opposing side walls of adjacent ones of the upstands defining respective ones of the recesses, wherein the interlock extends along an axis and the side walls include:
  bearing surfaces arranged to engage the complementary shaped termination in the interlock, the bearing surfaces extending at an angle of within 10° C. of the perpendicular to the direction of the interlock axis so that the reaction force at the interlock under axial loading does not induce separation of the terminations,
  first transition regions being formed above respective bearing surfaces and forming the intersection between the bearing surfaces and the bridging portions, and
  second transition regions extending from the respective bearing surfaces to base portions of the recesses, the first and second transition regions incorporating radii with the radius of the first transition regions being smaller than the radius of the second transition regions.

2. The reinforcing bar for concrete reinforcing according to claim 1, wherein the termination is made integral with the shaft.

3. The reinforcing bar for concrete reinforcing according to claim 1, wherein the termination is shaped to form an interlock with a complementary termination of identical shape to said termination.

4. The reinforcing bar for concrete reinforcing according to claim 3, wherein the bearing surfaces extend at angle of within 5° C. of the perpendicular to the direction of the interlock axis.

5. The reinforcing bar for concrete reinforcing according to claim 1, wherein the upstands are stepped downwardly along the engagement face towards the terminal end of the bar.

6. The reinforcing bar for concrete reinforcing according to claim 1, wherein a first said upstand extends in the longitudinal direction of the termination a distance greater than a second said upstand.

7. The reinforcing bar for concrete reinforcing according to claim 1, wherein said bar is formed from steel.

8. A coupling for interconnecting first and second reinforcing bars for concrete reinforcing, the coupling comprising:
  first and second terminations extending along an end portion of the first and second reinforcing bars respectively, at least one of the reinforcing bars having its termination integrally formed with a shaft of that reinforcing bar and being enlarged as compared to that shaft, each termination including an engagement face incorporating locking formations thereon, the engagement faces of the terminations being opposing abutting relation with the locking formations interfitting to form an interlock,
  wherein the locking formations comprise a plurality of spaced apart upstands extending transversely across the engagement face and a plurality of recesses disposed between adjacent ones of the upstands, each upstand includes opposite side walls interconnected by a bridging portion, and the opposing side walls of adjacent ones of the upstands defining respective ones of the recesses,
  wherein the interlock extends along the axis and the side walls include:
    bearing surfaces arranged to engage the complementary shaped termination in the interlock, the bearing surfaces extending at an angle of within 10° C. of the perpendicular to the direction of the interlock axis so that the reaction force at the interlock under axial loading does not induce separation of the terminations,
    first transition regions being formed above respective bearing surfaces and forming the intersection between the bearing surfaces and the bridging portions, and
    second transition regions extending from the respective bearing surfaces to base portions of the recesses, the first and second transition regions incorporating radii with the radius of the first transition regions being smaller than the radius of the second transition regions; and
  a retaining device disposed around the interlock to retain the engagement faces in the opposing abutting relation to one another.

9. A coupling for interconnecting first and second reinforcing bars for concrete reinforcing, the coupling comprising:
  first and second terminations extending along an end portion of the first and second reinforcing bars respectively, each termination being enlarged as compared to the shaft of the reinforcing bar, the terminations each including an engagement face incorporating locking formations thereon, the engagement faces of the terminations being in opposing abutting relation with the locking formations interfitting to form an interlock,
  wherein the locking formations comprise a plurality of spaced apart upstands extending transversely across the engagement face and a plurality of recesses disposed between adjacent ones of the upstands, each upstand includes opposite side walls interconnected by a bridging portion, and the opposing side walls of adjacent ones of the upstands defining respective ones of the recesses,
  wherein the interlock extends along the axis and the side walls include:
    bearing surfaces arranged to engage the complementary shaped termination in the interlock, the bearing surfaces extending at an angle of within 10° C. of the perpendicular to the direction of the interlock axis so that the reaction force at the interlock under axial loading does not induce separation of the terminations,
    first transition regions being formed above respective bearing surfaces and forming the intersection between the bearing surfaces and the bridging portions, and
    second transition regions extending from the respective bearing surfaces to base portions of the recesses, the first and second transition regions incorporating radii with the radius of the first transition regions being smaller than the radius of the second transition regions; and
  a retaining device disposed around the abutting terminations to retain the engagement faces in the opposing abutting relation to one another, wherein the coupling is arranged so that the interlock accommodates axial loading without inducing any substantial loading on the retaining device.

10. the coupling according to claim 9, wherein the reinforcement bars further comprise shafts extending along a portion of their length, and wherein at least one of the terminations is made integral with its shaft.

11. The coupling according to claim 9, wherein the retaining device is in the form of a sleeve.

12. The coupling according to claim 9, wherein the sleeve is slidable over the abutting terminations.

13. The coupling according to claim 9, wherein the sleeve has a shear strength that is greater than at least one of the reinforcing bars.

14. The coupling according to claim 9, wherein the first and second terminations are of identical shape.

15. The coupling according to claim 9, wherein the side walls incorporate bearing surfaces with the bearing surfaces of the first termination engaging with the bearing surfaces of the second termination in forming the interlock.

16. The coupling according to claim 9, wherein the bearing surfaces extend at an angle of within 5° C. of the perpendicular to the direction of the interlock axis.

17. The coupling according to claim 9, wherein in each termination, the upstands are stepped downwardly along the engagement face towards the terminal end of the respective bar.

18. The coupling according to claim 9, wherein a first said upstand is wider than a second said upstand.

19. The coupling according to claim 9, wherein the reinforcing bars are formed from steel.

20. The coupling according to claim 9, wherein the retaining device is in the form of a sleeve.

21. A method of connecting first and second reinforcing bars for concrete reinforcing, the method comprising the steps:
   interconnecting first and second reinforcing bars by forming an interlock between terminations formed on the end of the reinforcing bars, at least one of the reinforcing bars having its termination integrally formed with a shaft of that reinforcing bar being enlarged as compared to the shaft, the interlock being formed by interfitting locking formations formed on the respective terminations,
   wherein the locking formations comprise a plurality of spaced apart upstands extending transversely across the engagement face and a plurality of recesses disposed between adjacent ones of the upstands, each upstand includes opposite side walls interconnected by a bridging portion, and the opposing side walls of adjacent ones of the upstands defining respective ones of the recesses,
   wherein the interlock extends along the axis and the side walls include:
      bearing surfaces arranged to engage the complementary shaped termination in the interlock, the bearing surfaces extending at an angle of within 10° C. of the perpendicular to the direction of the interlock axis so that the reaction force at the interlock under axial loading does not induce separation of the terminations,
      first transition regions being formed above respective bearing surfaces and forming the intersection between the bearing surfaces and the bridging portions, and
      second transition regions extending from the respective bearing surfaces to base portions of the recesses, the first and second transition regions incorporating radii with the radius of the first transition regions being smaller than the radius of the second transition regions; and
   providing a retaining device about the interlock to retain the locking formations in interfitting relation.

22. A method of transferring load between first and second reinforcing bars for concrete reinforcing, the method comprising the steps of:
   interconnecting the first and second reinforcing bars by forming an interlock between terminations formed on the end of the reinforcing bars, at least one of the reinforcing bars having its termination integrally formed with a shaft of that reinforcing bar and being enlarged as compared to that shaft, the interlock extending along an axis and being formed by interfitting locking formations formed on the respective terminations,
   wherein the locking formations comprise a plurality of spaced apart upstands extending transversely across the engagement face and a plurality of recesses disposed between adjacent ones of the upstands, each upstand includes opposite side walls interconnected by a bridging portion, and the opposing side walls of adjacent ones of the upstands defining respective ones of the recesses,
   wherein the interlock extends along the axis and the side walls include:
      bearing surfaces arranged to engage the complementary shaped termination in the interlock, the bearing surfaces extending at an angle of within 10° C. of the perpendicular to the direction of the interlock axis so that the reaction force at the interlock under axial loading does not induce separation of the terminations,
      first transition regions being formed above respective bearing surfaces and forming the intersection between the bearing surfaces and the bridging portions, and
      second transition regions extending from the respective bearing surfaces to base portions of the recesses, the first and second transition regions incorporating radii with the radius of the first transition regions being smaller than the radius of the second transition regions; and
   providing a retaining device about the interlock to retain the locking formations in interfitting relation; and
   transferring loading through the interlock in the direction of the interlock axis without inducing any substantial load on the retaining device.

* * * * *

UNITED STATES PATENT AND TRADEMARK OFFICE
CERTIFICATE OF CORRECTION

| | | |
|---|---|---|
| PATENT NO. | : 8,123,429 B2 | Page 1 of 1 |
| APPLICATION NO. | : 11/883785 | |
| DATED | : February 28, 2012 | |
| INVENTOR(S) | : Ernest Comerford et al. | |

It is certified that error appears in the above-identified patent and that said Letters Patent is hereby corrected as shown below:

Column 9, Line 5, Claim 1, delete "10° C." and insert -- 10° --

Column 9, Line 29, Claim 4, after "extend at" insert -- an --

Column 9, Line 30, Claim 4, delete "5° C." and insert -- 5° --

Column 9, Line 50, Claim 8, after "terminations being" insert -- in --

Column 9, Line 63, Claim 8, delete "10° C." and insert -- 10° --

Column 10, Line 36, Claim 9, delete "10° C." and insert -- 10° --

Column 10, Line 57, Claim 10, delete "the coupling" and insert -- The coupling --

Column 11, Line 8, Claim 16, delete "5° C." and insert -- 5° --

Column 11, Line 28, Claim 21, after "reinforcing bar" insert -- and --

Column 11, Line 28, Claim 21, delete "to the" and insert -- to that --

Column 11, Line 41, Claim 21, delete "10° C." and insert -- 10° --

Column 12, Line 30, Claim 22, delete "10° C." and insert -- 10° --

Column 12, Line 44, Claim 22, after "regions;" delete "and"

Column 12, Line 45, Claim 22, after "device" delete "about the"

Signed and Sealed this
Twenty-ninth Day of May, 2012

David J. Kappos
*Director of the United States Patent and Trademark Office*